United States Patent
Sonoda et al.

(10) Patent No.: US 12,487,511 B2
(45) Date of Patent: Dec. 2, 2025

(54) IMAGING DEVICE

(71) Applicant: AGC Inc., Tokyo (JP)

(72) Inventors: Ryuta Sonoda, Tokyo (JP); Kentaro Oka, Tokyo (JP); Tetsuya Hiramatsu, Tokyo (JP)

(73) Assignee: AGC Inc., Tokyo (JP)

( * ) Notice: Subject to any disclaimer, the term of this patent is extended or adjusted under 35 U.S.C. 154(b) by 185 days.

(21) Appl. No.: 18/351,553

(22) Filed: Jul. 13, 2023

(65) Prior Publication Data

US 2023/0359111 A1   Nov. 9, 2023

Related U.S. Application Data

(63) Continuation of application No. PCT/JP2022/003044, filed on Jan. 27, 2022.

(30) Foreign Application Priority Data

Jan. 29, 2021   (JP) .................................. 2021-013719

(51) Int. Cl.
G03B 17/56   (2021.01)

(52) U.S. Cl.
CPC .................................. *G03B 17/561* (2013.01)

(58) Field of Classification Search
None
See application file for complete search history.

(56) References Cited

U.S. PATENT DOCUMENTS

| 7,438,774 B2* | 10/2008 | Kurfiss | .................. B60R 11/04 |
| | | | 396/419 |
| 2017/0341491 A1 | 11/2017 | Nakagawa | |
| 2020/0280703 A1* | 9/2020 | Nashimoto | ............. B60R 11/04 |
| 2021/0364893 A1* | 11/2021 | Matsuda | ............... F16B 47/006 |
| 2022/0006926 A1* | 1/2022 | Knox | ..................... G03B 17/02 |

FOREIGN PATENT DOCUMENTS

| EP | 3 444 894 B1 | 5/2020 |
| JP | 11-4429 A | 1/1999 |
| JP | 11-69211 A | 3/1999 |
| JP | 2000-155877 A | 6/2000 |
| JP | 2002-341432 A | 11/2002 |
| JP | 2005-192114 A | 7/2005 |
| JP | 2016-143155 A | 8/2016 |
| WO | WO-2018/179322 A1 | 10/2018 |

OTHER PUBLICATIONS

International Search Report issued Mar. 29, 2022 in PCT/JP2022/003044 filed on Jan. 27, 2022, 3 pages.

* cited by examiner

*Primary Examiner* — Rodney E Fuller
(74) *Attorney, Agent, or Firm* — Oblon, McClelland, Maier & Neustadt, L.L.P.

(57) ABSTRACT

To provide a hardly visible imaging device.
An imaging device, which comprises an imaging unit installed inside a window glass of a building, capturing images of outside of the window glass through the window glass, and
a fixing part fixing the imaging unit toward the window glass.

15 Claims, 8 Drawing Sheets

IMAGING DEVICE

TECHNICAL FIELD

The present invention relates to an imaging device.

BACKGROUND ART

Heretofore, a monitoring camera comprising a camera case, a lens housing cover and a front glass has been known. The monitoring camera is provided at a high place outdoors, facing downward with an inclination. The monitoring camera has a sewage guide groove which guides sewage such as rain water to a direction away from the lens housing cover and the front glass (for example, Patent Document 1).

PRIOR ART DOCUMENTS

Patent Documents

Patent Document 1: JP-A-2005-192114

DISCLOSURE OF INVENTION

Technical Problem

By the way, since a conventional monitoring camera is installed outdoors, it is easily visible by a person to be monitored, and is thereby likely to be warned. If the monitoring camera is likely to be warned, behavior of a person to be monitored may not sufficiently be monitored.

Under these circumstances, the object is to provide a hardly visible imaging device.

Solution to Problem

The imaging device according to an embodiment of the present disclosure comprises an imaging unit installed inside a window glass of a building, to capture images of outside of the window glass through the window glass, and a fixing part to fix the imaging unit toward the window glass.

Advantageous Effects of Invention

A hardly visible imaging device can be provided.

DESCRIPTION OF EMBODIMENTS

Embodiments

Now, the present embodiment will be described with reference to drawings. In the following, the scales of members in the drawings may sometimes be different from actual ones for easy understanding. In this embodiment, the three-dimensional rectangular coordinate system in the three-axis directions (X axis direction, Y axis direction, Z axis direction) is employed, where the window glass width direction is the Y axis direction, the window glass thickness direction is the Z axis direction, and the window glass height direction is the X axis direction. The direction from the bottom to the top of the window glass is +X axis direction, and the opposite direction is −X axis direction. In the following description, +X axis direction may sometimes be referred to as upward, and −X axis direction as downward. Further "viewed in a plan view" means "viewed in the XY plane".

The X axis direction, the Y axis direction and the Z axis direction respectively represent a direction in parallel with the X axis, a direction in parallel with the Y axis and a direction in parallel with the Z axis. The X axis direction, the Y axis direction and the Z axis direction are orthogonal to one another. The XY plane, the YZ plane and the ZX plane respectively represent a virtual plane in parallel with the X axis direction and the Y axis direction, a virtual plane in parallel with the Y axis direction and the Z axis direction, and a virtual plane in parallel with the Z axis direction and the X axis direction.

Figure 1:
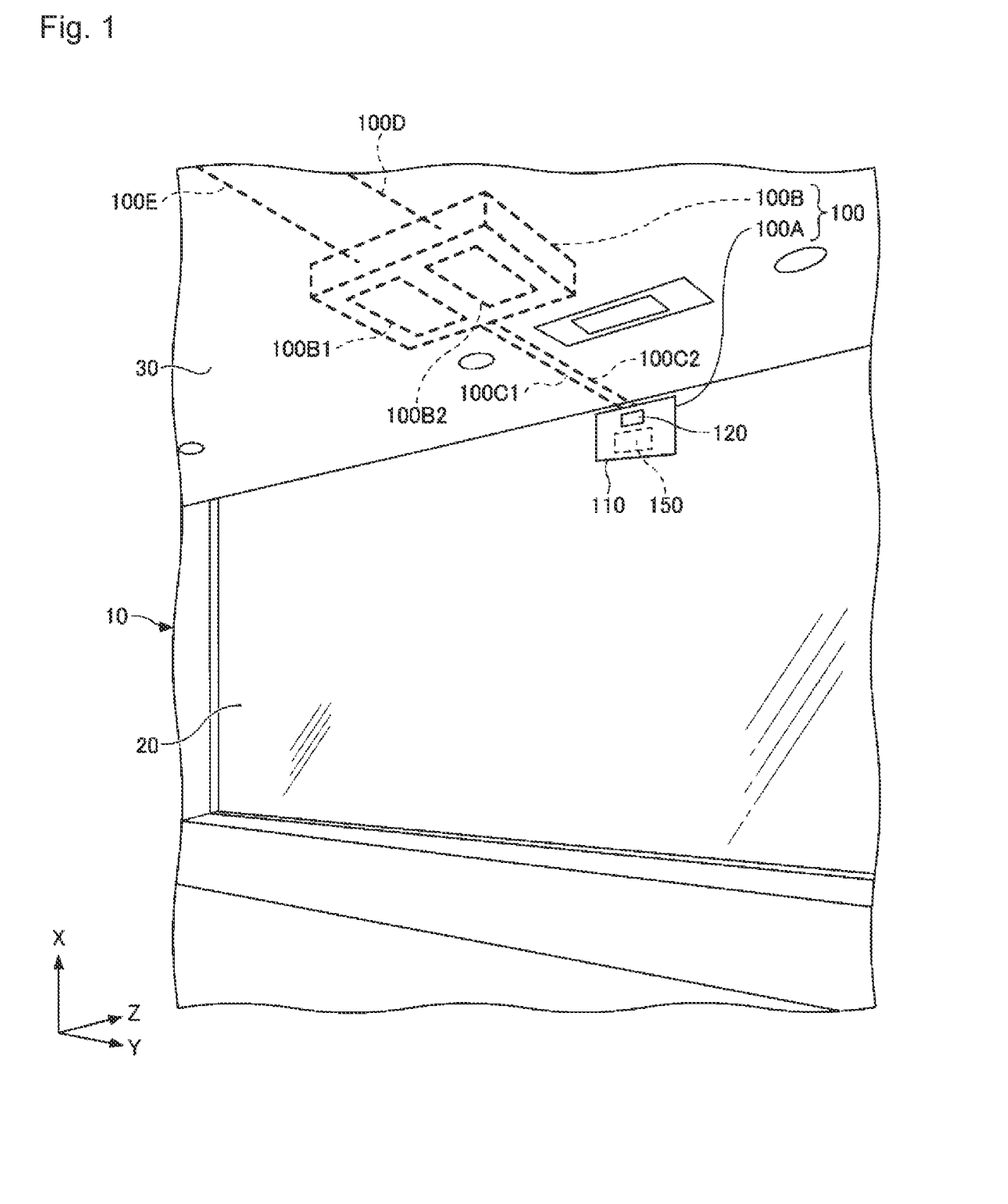
FIG. 1 is a view illustrating an example of disposition of an imaging device 100.

FIG. 1 is a view illustrating an example of disposition of an imaging device 100. The imaging device 100 has an imaging unit 100A and a processing unit 100B. The imaging unit 100A is used as installed to face the surface on the interior side of a window glass 20 of a building 10. The building 10 is an example of a building structure. Further, the processing unit 100B is installed on the rear side of the ceiling of the building 10, and is connected to the imaging unit 100A via cables 100C1 and 100C2. For example, the Y axis direction and the Z axis direction are substantially in parallel with a direction in parallel with the horizontal plane (horizontal direction), and the X axis direction is substantially in parallel with the vertical direction perpendicular to the horizontal plane. The processing unit 100B may also be installed on the wall or the floor.

Here, an embodiment in which the window glass 20 is attached to the building 10 is described, however, the window glass 20 may be attached to a building structure other than the building 10. Examples of the building structure other than the building 10 include civil engineering structures such as a pier of a bridge, a bridge and a dam, historical structures and artistic structures.

The window glass 20 is a glass plate to be used for a window of a building structure such as the building 10. The window glass 20 may be a glass facade e.g. at the entrance of the building 10. The window glass 20 is formed, for example, into a rectangular shape as viewed in a plan view, and has an outside surface of the building 10 and an inside surface of the building 10. The inside of the building 10 means the interior side of the building 10. The thickness of the window glass 20 is set depending upon the specifications required for the building 10. The rectangular shape is meant to include a rectangle and a square and in addition, a rounded rectangle and a rounded square. The shape of the window glass as viewed in a plan view is not limited to a rectangular shape and may be other shape such as a circular shape.

The window glass 20 is not limited to a single plate, and may be laminated glass or insulated glazing. Further, the window glass 20 may be Low-e glass, light control glass or linear member-containing glass.

The material of the window glass 20 may, for example, be soda lime silica glass, borosilicate glass, aluminosilicate glass or alkali free glass.

The thickness of the window glass 20 is preferably 1.0 to 20 mm. When the thickness is 1.0 mm or more, the window glass 20 has sufficient strength to have the imaging unit 100A attached. Further, when the thickness of the window glass is 20 mm or less, the window glass has good electric wave transmission performance. The thickness of the window glass is more preferably 3.0 to 15 mm, further preferably 9.0 to 13 mm.

Further, the reflectance on the outside surface of the window glass 20 is, as an example, 5% or more. The reflectance is a visible light reflectance as specified by JIS R 3106:1998. Further, the window glass 20 has a visible light transmittance (TVA) based on standard illuminant A, as specified by JIS R 3106:1998, of from 30% to 98% as an example. TVA of the window glass 20 is preferably 50% or more, more preferably 70% or more, further preferably 75% or more, particularly preferably 80% or more. TVA of the window glass 20 is preferably 95% or less, more preferably 92% or less, further preferably 90% or less, particularly preferably 85% or less.

In the example shown in FIG. 1, the imaging unit 100A is a device used as attached to the interior side of the window glass 20 of the building 10, and has a glass plate 110, a camera 120 and an antenna 150. The glass plate 110 is an example of the transparent plate. The camera 120 is an example of the imaging unit and can capture video images and still images. With reference to FIG. 1, schematic constitution and functions of the imaging device 100 are described, and a constitution in detail of the imaging unit 100A will be described later with reference to FIGS. 2 to 4.

The processing unit 100B has an image processor 100B1 and a wireless communication device 100B2. The image processor 100B1 is connected to the camera 120 via the cable 100C1 and is connected to a server in the building 10 via the cable 100D. The image processor 100B1 conducts image processing on data representing images captured by the camera 120, and stores image data obtained by image processing in an internal memory. The image processor 100B1 transmits the image data stored in the internal memory to the server via the cable 100D. In a case where the image processor 100B1 transmits the image data to the wireless communication device 100B2 and the wireless communication device 100B2 transmits the image data from the antenna 150 to the server, the cable 100D may be a cable having a small transmission capacity.

The wireless communication device 100B2 is connected to the antenna 150 via the cable 100C2. The wireless communication device 100B2 conducts data communication via the antenna 150. The processing unit 100B receives power from a power system of the building 10 via a power cable 100E. The processing unit 100B may receive power from a power system of the building in contactless without using the power cable 100E.

The imaging device 100 captures images of an object outside the window glass 20 through the window glass 20 by the camera 120. The object may, for example, be the scenery seen from the window glass 20 (everything that can be seen from the window glass 20), and the scenery may, for example, be a road, a walkway, a pathway, an intersection, an entrance of the building 10, or a gate or entrance of a station, and may include persons, vehicles, etc. In a case where the camera 120 is an infrared camera, infrared images may be captured. Information captured by the imaging device 100 may be utilized for digital twin computing.

Such an imaging device 100 may be used for various applications and its application is not limited. The imaging device 100 captures images of an object outside the window glass 20 of the building 10, and the obtained images can be used for various applications. Here, as an example, an embodiment in which the imaging device 100 is used as a monitoring camera for security will be described. The imaging unit 100A is disposed to face the surface on the interior side of the window glass 20, and is thereby hardly seen from outside the window glass 20 due to reflection. Thus, the application as a monitoring camera is an example of a preferred application of the imaging device 100.

The height of the position at which the imaging unit 100A is attached to the window glass 20 is preferably higher than the average human height, so that the area to be monitored will be well viewed. For example, the height at which the imaging unit 100A is attached to the window glass 20, is preferably 2 m or hither, and for example, the imaging unit 100A may be attached to a window glass 20 on the second or higher floor of the building 10. When the imaging unit 100A is attached to the window glass 20 at a height of 2 m or more, it is hardly visible from a person to be monitored. The height at which the imaging unit 100A is attached to the window glass 20 may be 3 m or more, may be 4 m or more, or may be 5 m or more. The upper limit of the height at which the imaging unit 100A is attached to the window glass 20 is not particularly limited, and may be 30 m or less, may be 20 m or less, and may be 10 m or less.

The height of the position at which the imaging unit 100A is attached to the window glass 20 may be set so that appropriate images can be captured, considering, as an example, a range which can be captured by the angle of view of the camera 120, the distance to the object, etc. The upper limit of the height of the position at which the imaging unit 100A is attached to the window glass 20, is the height of the upper edge of the highest window glass 20 among window glasses 20 of the building 10. The height of the imaging unit 100A is defined as the height from a standard surface in parallel with the horizontal plane (for example, the ground, the floor level or virtual plane). The height of the imaging unit 100A may be the height of the lens of the camera 120.

Further, the imaging device 100 may conduct wireless communication by the antenna 150. The imaging unit 100A of the imaging device 100 may not have the antenna 150, however, an embodiment in which the imaging unit 100A has the antenna 150 is described.

In a case where the imaging unit 100A has the antenna 150, and in a case where the window glass 20 is Low-e glass, Low-e glass may have a constitution as below. Low-e glass is also referred to as low emission glass, and may be one having its surface on the interior side coated with a coating layer having a heat ray reflecting function (transparent conductive layer). In such a case, the coating layer may have an opening so as to suppress a decrease in the radio wave transmission performance. The opening is located preferably at a position facing at least a part of a plurality of radiating elements described later. The opening may be patterned. Patterning means a state where the coating layer remains for example in a lattice form. Only a part of the opening may be patterned. Further, linear member-containing glass contains a linear member formed of e.g. a metal inside glass. The linear member may have a network structure, and the linear member-containing glass is also referred to as wired glass.

The imaging device 100 may conduct wireless communication with e.g. a communication device present outside the window glass 20, or may conduct wireless communication with e.g. a communication device present inside the window glass 20, utilizing the antenna 150. The communication device may, for example, be a smartphone, a tablet computer, a gaming machine or other electronic device having a communication function.

Wireless communication conducted with e.g. a communication device present outside or inside the window glass 20 may, for example, be communication utilizing the fifth generation mobile communication system (5G: Fifth Generation), the fourth generation mobile communication system (4G: Fourth Generation), LAN (Local Area Network) such as IEEE802.11ac, Bluetooth (registered trademark), etc. Position information relating to a person to be an object may be detected by the imaging device 100 and used for controlling beam forming in 5G communication.

The wireless communication device 100E32 and the antenna 150 may be utilized, for example, as wireless base stations for 5G or 4G, public wireless LAN spots providing internet access utilizing wireless LAN, or public mobile spots providing an area where data communication utilizing Bluetooth (registered trademark) is possible, and may have a plurality of communication means. Further, the wireless communication device 100B2 and the antenna 150 may send image data captured by the camera 120 and image-processed by the image processor 100B1 to a communication device present outside or inside the window glass 20.

Here, as an example, an embodiment is described in which the wireless communication device 100B2 and the antenna 150 function as a wireless base station for 5G communication and conduct 5G communication with e.g. a communication device present outside the window glass 20. In this case, the wireless communication device 100E32 is connected to a base band unit. The base band unit is a device to conduct communication control of 5G communication, and may be constituted by a general purpose server. Further, the general purpose server not only has a base band unit function but also may be utilized for edge computing. The antenna 150 may be, as an example, an antenna capable of sending/receiving radio waves in a high frequency band (for example from 0.3 GHz to 300 GHz) such as microwaves including millimeter waves. Further, a plurality of the antennas 150 may be installed. In a case where a plurality of the antennas 150 is installed, for example, a plurality of the imaging units 100A may be connected to one wireless communication device 100B2.

<Constitution of Imaging Unit 100A in Detail>

FIG. 2 is views illustrating the imaging unit 100A. The imaging unit 100A has a glass plate 110, a camera 120, an attaching part 130 and an antenna 150. The glass plate 110 and the attaching part 130 are examples of the fixing part.

Figure 2A:
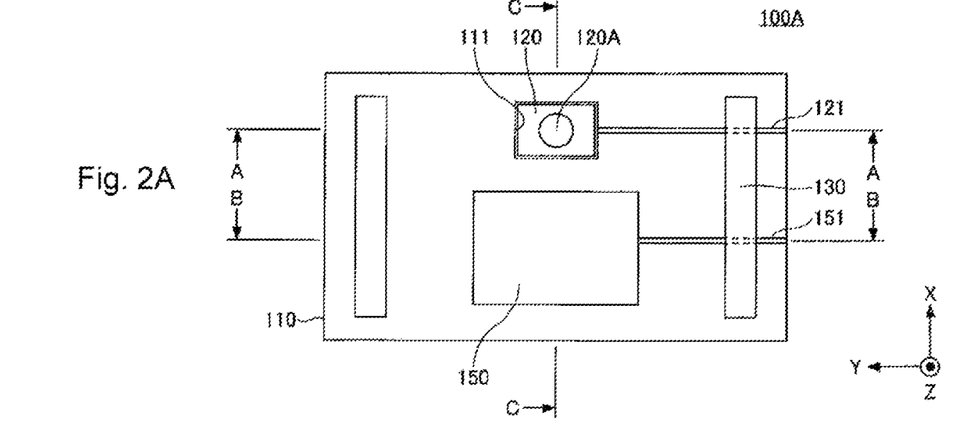
FIG. 2A is a plan view illustrating an imaging unit 100A.
Figure 2B:
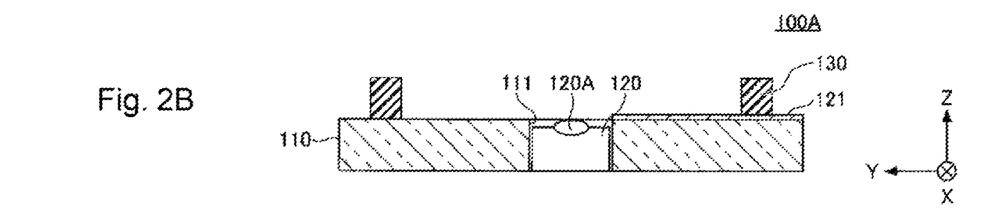
FIGS. 2B, 2C and 2D are respectively an A-A arrow view, a B-B arrow view and a C-C arrow view of FIG. 2A.
Figure 2C:
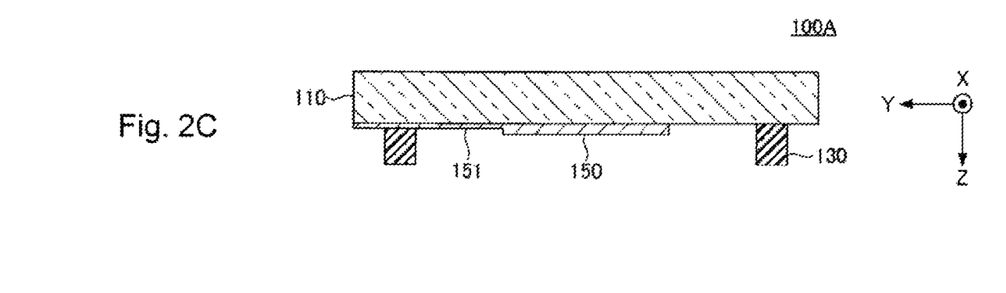
Figure 2D:
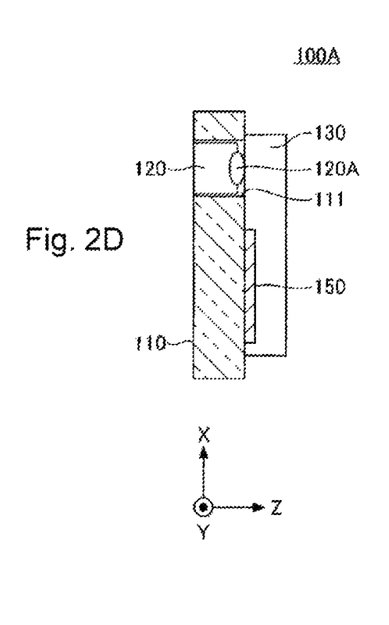

FIG. 2A is a plan view illustrating the imaging unit 100A, and FIGS. 2B, 2C and 2D are respectively an A-A arrow view, a B-B arrow view and a C-C arrow view of FIG. 2A.

The glass plate 110 is rectangular as viewed in a plan view and is a transparent (colorless transparent) glass made plate-shaped member. The glass plate 110 is fixed to the inside surface of the window glass 20 by two attaching parts 130. The glass plate 110 may not be transparent but is preferably transparent in that the imaging unit 100A is less likely to outstand from outside the window glass 20, and the field of view of the window glass 20 will not be obstructed from inside the building 10. In the present disclosure, "transparent" includes translucent, and for example, means a visible light transmittance (TVA) based on standard illuminant A as specified by JIS R 3106:1998 of 20% or more, preferably 50% or more, more preferably 70% or more.

The glass plate 110 has a through-hole 111 that pierces the glass plate 110 in the Z direction substantially at the center of the length in the Y direction. The shape of the opening of the through-hole 111 is in conformity with the outer shape of the camera 120 to be held, and is rectangular as an example. The through-hole 111 is an example of a holding part to hold the camera 120. Here, as an example, an embodiment in which the through-hole 111 holds the entire camera 120 is described, however, the through-hole 111 may hold at least a part of the camera 120. That is, for example, a part of the camera 120 may protrude from the through-hole 111.

The camera 120 is a camera which can capture digital video and still images, and as an example, a camera having an image sensor using as an imaging device CMOS (Complementary Metal Oxide Semiconductor) or CCD (Charge Coupled Device). The camera 120 has a lens 120A.

The camera 120 is fixed inside the through-hole 111 so that the lens 120A faces the window glass 20, to capture images of an object outside the window glass 20. The camera 120 may or may not have telephoto function. In a case where the camera 120 has no telephoto function, the camera 120 is available at a low cost, and thus the imaging device 100 can be produced at a low cost.

The size of the camera 120 as viewed in a plan view is, as an example, 2 mm to 200 mm (Y direction)×2 mm to 200 mm (Z direction), and is preferably 5 mm to 50 mm (Y direction)×5 mm to 50 mm (Z direction). The smaller the size of the camera 120 as viewed in a plan view, the less the camera 120 will be visible from outside the window glass 20, and the less the camera 120 will outstand. The size of the camera 120 as viewed in a plan view is the size of the housing of the camera 120 as viewed in a plan view. This is because the entire housing of the camera 120 is a portion visible through the window glass 20.

The camera 120 is connected to the cable 100C1 (see FIG. 1) via a wiring 121 provided on the surface on the +Z direction side of the glass plate 110. In FIG. 2, the wiring 121 is simplified and represented by one line, however, actually, a plurality of wirings 121 is provided. The plurality of wirings 121 includes a wiring to send image data, a wiring for controlling on/off of the camera 120, and a power wiring. The cable 100C1 also includes a wiring to send image data, a wiring for controlling on/off of the camera 120, and a power wiring.

The wiring 121 is, as an example, a wiring constituted by a metal mesh layer provided on the surface on the +Z direction side of the glass plate 110. The metal mesh layer is made of copper as an example. By the wiring 121 constituted by a metal mesh layer, the wiring 121 can have light transparency, and as a result, the imaging unit 100A is less likely to outstand from outside the window glass 20, and the field of view of the window glass 20 is less likely to be obstructed from inside the building 10. As a method of forming the wiring 121, a known method may be employed, such as sputtering or deposition.

The mesh means the wiring 121 having through-holes in a network structure as viewed in a plan view. The line width of the mesh is preferably from 0.1 to 30 µm, more preferably from 0.2 to 15 µm. The line interval of the mesh is preferably from 5 to 500 µm, more preferably from 10 to 300 µm. The shape of the opening of the through-holes of the mesh may be polygonal, such as rectangular, hexagonal or rhomboidal.

The attaching part 130 is attached to each edge in the Y direction on the surface on the +Z direction side of the glass plate 110, and extends in the X direction. The attaching part 130 is a member to fix the glass plate 110 to the inside surface of the window glass 20. The attaching part 130 is preferably transparent (colorless transparent) when the glass plate 110 is transparent. Such an attaching part 130 may be prepared, for example, by a resin such as an acrylic resin or a polycarbonate resin, or glass. When the attaching part 130 is not transparent, the attaching part 130 may be made of a rubber such as butyl rubber.

The means of attaching the attaching part 130 to the glass plate 110 is not limited, and as an example, the attaching part 130 may be attached to the glass plate 110 e.g. by an adhesive or a double-sided adhesive tape. The attaching part 130 may be formed integrally with the glass plate 110. Further, the means of attaching the attaching part 130 to the window glass 20 is not limited, and as an example, the attaching part 130 may be attached to the window glass 20 e.g. by an adhesive or a double-sided adhesive tape. In a case where the glass plate 110 and the attaching part 130 are transparent (colorless transparent), the adhesive and the double sided adhesive tape are also preferably transparent.

The antenna 150 is installed substantially at the center of the length in the Y direction, on the −X direction side of the through-hole 111, on the surface on the +Z direction side of the glass plate 110. The antenna 150 should be, as described above, as an example, an antenna capable of sending/receiving radio waves in a high frequency band, and may be an antenna such as a patch antenna, a monopole antenna or a dipole antenna. In this explanation, as an example, the imaging device 100 has a function as a wireless base station of 5G communication, and thus the antenna 150 should have a plurality of antenna elements capable of beam output by beam forming.

The antenna 150 is installed on the surface on the +Z direction side of the glass plate 110, because in this explanation, as an example, the wireless communication device 100B2 and the antenna 150 function as a wireless base station of 5G communication, and conduct 5G communication with e.g. a communication device present outside the window glass 20. The antenna 150 is installed on the surface on the +Z direction side of the glass plate 110, so that the antenna 150 has directivity toward outside the window glass 20. Thus, in a case where the antenna 150 is used for communication inside the building 10, the antenna 150 may be installed on the surface on the −Z direction side of the glass plate 110.

Further, in a case where the antenna 150 is an antenna of such a type as having an antenna element and a ground layer, as a patch antenna or a monopole antenna, the antenna element may be provided on the surface on the +Z direction side of the glass plate 110, and the ground layer may be provided on the surface on the −Z direction side of the glass plate 110, so that the antenna 150 has directivity toward outside the window glass 20. Further, in a case where the antenna 150 is used for communication inside the building 10, in order that the antenna 150 has directivity toward inside the building 10, the antenna element may be provided on the surface on the −Z direction side of the glass plate 110, and the ground layer may be provided on the surface on the +Z direction side of the glass plate 110.

The antenna 150 is connected to the cable 100C2 (see FIG. 1) via a wiring 151 provided on the surface on the +Z direction side of the glass plate 110. In FIG. 2A, the wiring 151 is simplified and represented by one line, however, wirings 121 are provided according to the number of antenna elements of the antenna 150 and whether the antenna 150 has a ground layer or not. Further, in FIG. 2C, the antenna 150 is represented thicker than the wiring 151 so as to clearly show the boundary between the antenna 150 and the wiring 151, however, actually, the antenna 150 and the wiring 151 are equal in the thickness.

The antenna 150 and the wiring 151 are constituted, as an example, by a metal mesh layer. The metal mesh layer is made of copper as an example. When the antenna 150 and the wiring 151 are constituted by a metal mesh layer, the antenna 150 and the wiring 121 can have light transparency, and as a result, the imaging unit 100A is less likely to outstand from outside the window glass 20, and the field of view of the window glass 20 is less likely to be obstructed from inside the building 10. The line width, the line distance and the shape of the opening of the through-holes of the mesh of the antenna 150 and the wiring 151 may be the same as those of the wiring 121. As a method of forming the antenna 150 and the wiring 151, a known method may be employed, such as sputtering or deposition.

The antenna 150 and the wiring 151 may be constituted by a transparent conductive film. By the antenna 150 and the wiring 151 being constituted by a transparent conductive film, the antenna 150 and the wiring 151 can have light transparency. For the transparent conductive film, for example, a light transparent conductive material such as indium tin oxide (ITO), fluorine-doped tin oxide (FTO), indium zinc oxide (IZO), silicon oxide-doped indium tin oxide (ITSO), zinc oxide (ZnO), or a Si compound containing P or B may be used.

The imaging unit 100A may have a protective material provided on the glass plate 110, for protecting the antenna 150, the wiring 151 and the ground layer. The protective material may be provided on the surface on the +Z direction side of the glass plate 110 having the antenna 150 and the wiring 151 provided thereon, or may be provided on the surface on the −Z direction side of the glass plate 110 having the ground layer provided thereon.

The protective material is bonded to the glass plate 110 for example via an interlayer of e.g. polyvinyl butyral or ethylene/vinyl acetate and laminated. To bond the protective material to the glass plate 110, other adhesive, such as an optical transparent adhesive, may be used instead of the interlayer. When the interlayer is used, the thickness of the interlayer is for example 0.37 mm. Further, the interlayer or other adhesive such as an optical transparent adhesive may contain an ultraviolet absorber, whereby deterioration of the antenna 150, the wiring 151 and the ground layer can be prevented.

As the protective material, glass such as soda lime glass, alkali free glass or borosilicate glass, a resin such as polyethylene terephthalate (PET) or polyethylene, a glass resin composite (for example fiber-reinforced plastic) or a ceramic may, for example, be used. By the protective material, deterioration of the antenna 150, the wiring 151 and the ground layer by ultraviolet rays, moisture (water vapor) or water, and damages or breakage by mechanical contact, can be prevented. The thickness of the protective material is as an example from 0.05 mm to 5.0 mm.

<Mounting of Imaging Unit 100A on Window Glass 20>

Figure 3:
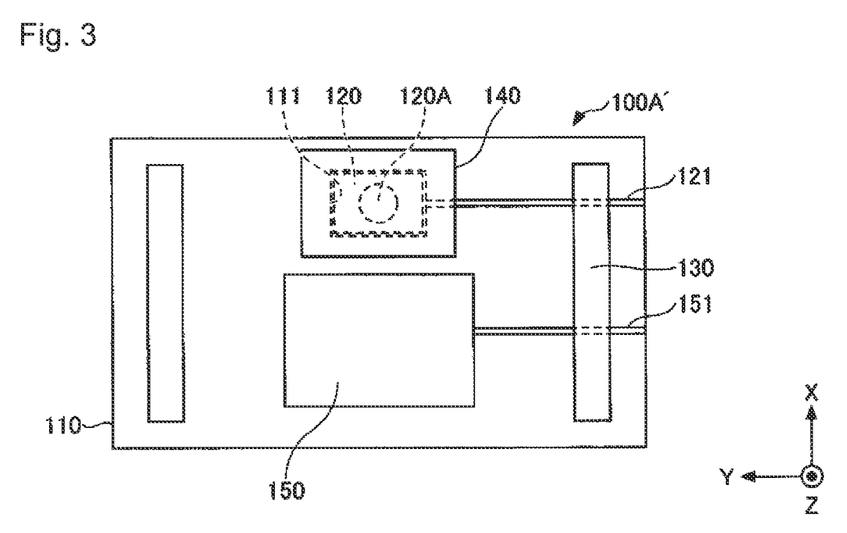
FIG. 3 is a plan view illustrating an imaging unit 100A'.

FIG. 3 is a view illustrating an imaging unit 100A'. The imaging unit 100A' shown in FIG. 3A has a low refractive index layer 140 in addition to the imaging unit 100A shown in FIG. 2A.

The low refractive index layer 140 is provided to cover the opening of the through-hole 111 on the surface on the +Z direction side of the glass plate 110. The low refractive index layer 140 is bonded to the surface on the +Z direction side of the glass plate 110 e.g. by an adhesive or a double-sided adhesive tape. The low refractive index layer 140 should cover at least the opening of the through-hole 111, and may be provided on the entire surface on the +Z direction side of the glass plate 110. In a state where the imaging unit 100A' is attached to the inside surface of the window glass 20, there is a space between the low refractive index layer 140 and the inside surface of the window glass 20, and air is present in this space. The low refractive index layer 140 may be provided to fill the space between the glass plate 110 and the window glass 20, so as not to form such a space.

Further, the embodiment is not limited to a constitution such that the low refractive index layer 140 is provided on the surface on the +Z direction side of the glass plate 110, so long as it is provided between the glass plate 110 and the window glass 20. The low refractive index layer 140 may be held, for example, between the two attaching parts 130 with a space in the Z direction from the glass plate 110. Further, the low refractive index layer 140 may be bonded to the inside surface of the window glass 20.

The low refractive index layer 140 has a refractive index lower than the refractive index of the window glass 20. Further, the refractive index of the low refractive index layer 140 is preferably higher than 1. By the low refractive index layer 140 having a refractive index higher than 1 and lower than the refractive index of the window glass 20, reflection of light propagating in air can be suppressed at the interface with air having a refractive index of 1, and clear images can be captured by the camera 120.

As the low refractive index layer 140, as an example, a liquid crystal of which the refractive index changes by the voltage applied may be used. The liquid crystal is an example of a variable refractive index layer of which the refractive index is variable. As the window glass 20 to which the imaging unit 100A' is attached, various types of glass may be used, and the refractive index may vary depending upon the type of the window glass 20. Further, the outside or inside surface of the window glass 20 may have a coating or the like, and the refractive index may vary depending upon the type of coating. Thus, the refractive index of the low refractive index layer 140 may be optimized by adjusting the voltage applied to the low refractive index layer 140 according to the refractive index of the window glass 20. As the low refractive index layer 140, crystallized glass of which the refractive index changes by the voltage applied may be used.

In order that the camera 120 is hardly visible from outside the window glass 20, a high refractive index layer having a refractive index higher than the refractive index of the window glass 20 may be bonded to the inside or outside surface of the window glass 20, whereby an effect to increase the refractive index of the window glass 20 can be achieved, and the inside of the window glass 20 will hardly be visible from outside. By increasing the reflectance to light which enters from outside the window glass 20, the camera 120 will hardly be visible from outside the window glass 20. A monitoring camera is less likely to be warned when the camera 120 is not seen from outside the window glass 20, than when seen from outside the window glass 20, and thus images including behavior (for example suspicious behavior) of a person to be monitored, outside the window glass 20, not on the alert, are likely to be acquired. Further, when the monitoring camera is not seen from outside the window glass 20, its presence is not noticed from outside the window glass 20, subconscious such that an invisible camera 120 may be installed somewhere can be imparted to persons to be monitored, and such will act as a deterrent to crime, etc.

As such a high refractive index layer, as an example, a sheet-shaped member prepared by a resin which can realize an optical waveguide such as an optical fiber may be used. Further, the high refractive index layer may be a sheet-shaped member having a refractive index to make the window glass 20 a half mirror (a partial mirror) seen from outside (as an example from 40% to 70%). Further, as the high refractive index layer, a heat reflective film or a high refractive index glass may be used. As the high refractive index glass, for example, La—B based, Nb—Si based, $SiO_2$ based or $P_2O_5$ based optical glass may be used.

The high refractive index layer may be provided on the entire window glass 20 or may be provided only on a region overlapping with the imaging unit 100A as viewed from outside the window glass 20, because it is only the region overlapping with the imaging unit 100A as viewed from outside the window glass 20 that is to have a high refractive index. Further, the design property of the window glass 20 is less likely to be impaired when the high refractive index layer is provided only on the region overlapping with the imaging unit 100A. The high refractive index layer is provided preferably on the inside surface than on the outside surface of the window glass 20, whereby it is less likely to outstand.

Further, in a case where the window glass 20 may have dew condensation, an antifogging film may be provided at least on a region overlapping with the imaging unit 100A as seen from outside the window glass 20. The antifogging film should be provided on one side of the window glass 20. The antifogging film preferably contains, as an example, a water-absorptive polymer or a hydrophilic polymer and thereby achieves high water absorption. The antifogging film may be attached to the window glass 20 via a film having an adhesive layer. By providing the antifogging film on the window glass 20, dew condensation can be suppressed, and clear images can be acquired by the camera 120.

Figure 4:
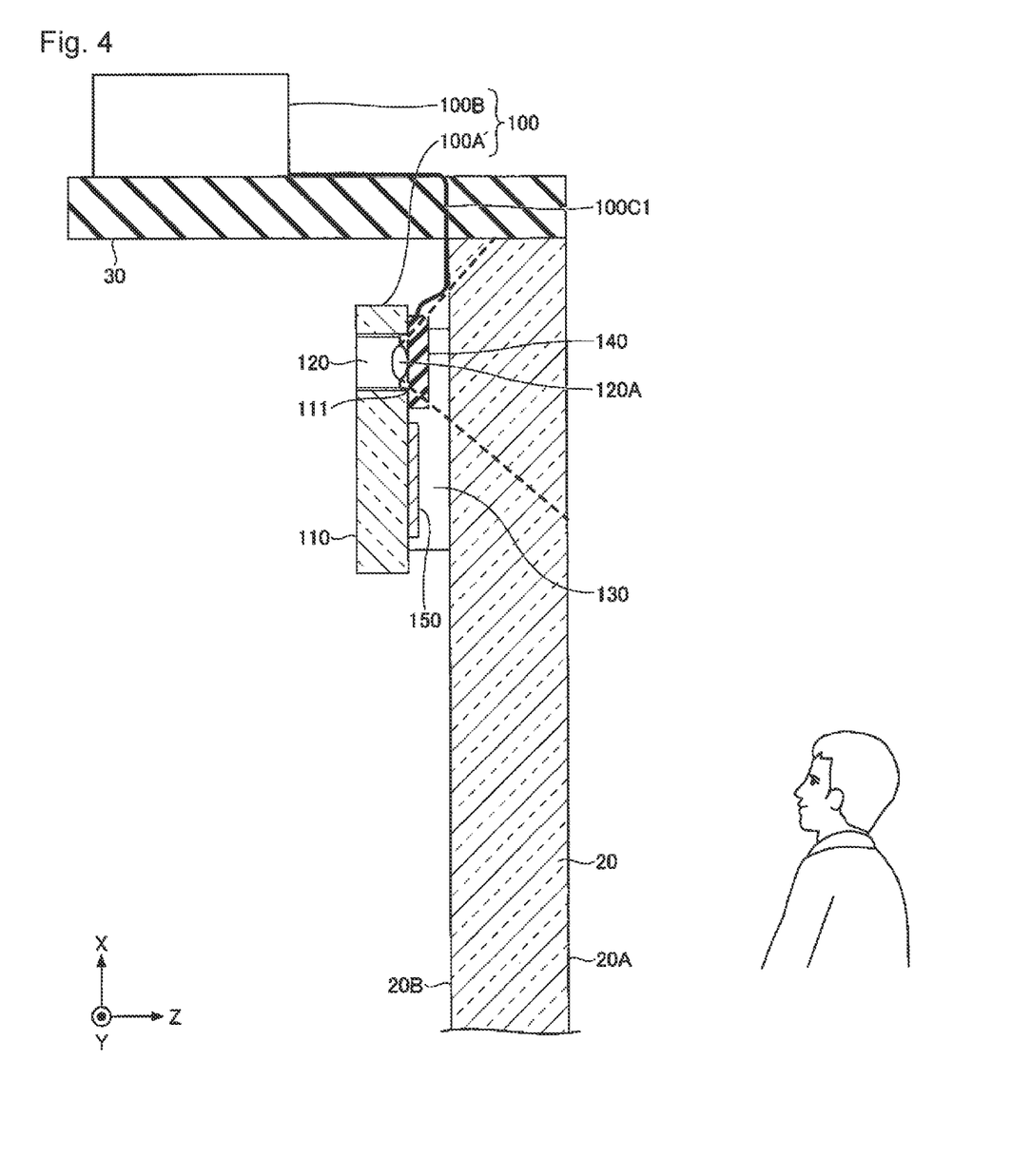
FIG. 4 is a view illustrating a state where an imaging unit 100A' is attached to a window glass 20.

FIG. 4 is a view illustrating a state where the imaging unit 100A' is attached to the window glass 20. In FIG. 4, the imaging unit 100A' is illustrated by a cross section corresponding to FIG. 2D, and the window glass 20 is also illustrated by a cross section at a position corresponding to the cross section of the imaging unit 100A'. The window glass 20 has an outside surface 20A and an inside surface 20B. The imaging unit 100A' is fixed to the surface 20B in the vicinity of the upper edge of the window glass 20. More specifically, by fixing the attaching part 130 to the surface 20B, the imaging unit 100A' is fixed to the surface 20B of the window glass 20. Further, in FIG. 4, the range of the angle of field of the camera 120 in the XZ plane is indicated by two broken lines. The angle of field corresponds to the field of view of the camera 120.

Here, the visible light transmittance from the outside surface 20A of the window glass 20 to the camera 120 should be from 60% to 90% as the light transmittance based on standard illuminant A as specified by JIS R 3106:1998. The visible light transmittance is preferably 40% or more, more preferably 50% or more, further preferably 60% or more. Further, the visible light transmittance is preferably 80% or less, more preferably 70% or less. By setting the visible light transmittance to such a range, favorable images of an object outside the window glass 20 can be acquired by the camera 120.

As described above, even when the imaging unit 100A attached to the inside of the window glass 20 is seen by a person from outside the window glass 20, the scenery around the person in front of the window glass 20 is reflected on the outside surface 20A of the window glass 20, and thus the imaging unit 100A is hardly visible and the presence of the camera 120 is hardly noticed. Further, particularly the camera 120 covered by the low refractive index layer 140 is hardly visible from outside the window glass 20.

Accordingly, it is possible to provide a hardly visible imaging device 100. Further, since the camera 120 is set at a position higher than the human height, images with which the behavior of a person to be monitored and the like outside the window glass 20 is easily grasped, can be captured.

The imaging unit 100A is installed on the interior side relative to the window glass 20 in the building 10, and thus installation operation of the imaging unit 100A can be conducted by interior work and is easy. Further, since the imaging unit 100A is installed on the interior side relative to the window glass 20 in the building 10, the imaging unit 100A will not be exposed to the weather, and thus the imaging unit 100A can be realized by a simple constitution without waterproof structure or dustproof structure.

The imaging unit 100A preferably has the glass plate 110 to which the camera 120 is attached, and the attaching part 130 which attaches the glass plate 110 to the inside surface of the window glass 20. By such a constitution, the camera 120 can be stably fixed to the window glass 20 easily by a simple constitution. Further, the attaching part 130 is preferably transparent. By such a constitution, the imaging unit 100A will hardly be visible from outside the window glass 20, and the camera 120 will hardly be noticed.

The imaging unit 100A preferably further has an antenna 150 constituted by a metal mesh, provided on the surface of the glass plate 110. By such a constitution, the imaging unit 100A can be utilized as an antenna unit, and in addition to capturing images around the imaging unit 100A, wireless communication e.g. around the imaging unit 100A can be conducted.

The antenna 150 is preferably disposed at a relatively high position on the window glass 20 of the building 10 so as to face the window glass 20. By such a constitution, there will be no obstacle between the antenna 150 and the window glass 20, and radio waves can effectively radiate toward outside the window glass 20. Thus, the antenna 150 can form a communication area which achieves a relatively high throughput outside the window glass 20.

Further, the antenna 150 preferably further has a wiring 121 connected to the camera 120, provided on the surface of the glass plate 110, and the wiring 121 is constituted by a metal mesh. By such a constitution, the wiring 121 can have high light transparency, and will be hardly visible even when provided on a transparent glass plate 110. Thus, the imaging unit 100A having the wiring 121 can be hardly visible from outside the window glass 20, and a hardly visible imaging device 100 can be provided.

The glass plate 110 preferably has a through-hole 111 which holds at least a part of the camera 120. By such a constitution, the camera 120 can be stably attached to the glass plate 110 by a simple constitution.

Further, the imaging device 100 preferably has a low refractive index layer 140 having a refractive index lower than the refractive index of the window glass 20, provided between the glass plate 110 and the window glass 20. By such a constitution, the reflectance to light which enters from outside the window glass 20 can be increased, and the camera 120 can be hardly visible from outside the window glass 20. In a case where the imaging device 100 is utilized as a monitoring camera, the camera 120 is less likely to be warned when not seen from outside the window glass 20 than when seen from outside the window glass 20, and images indicating behavior of a person not on the alert are likely to be acquired. Further, when the monitoring camera is not seen from outside the window glass 20, its presence is not noticed from outside the window glass 20, subconscious such that an invisible camera 120 may be installed somewhere can be imparted to persons outside the window glass 20, and such will act as a deterrent to crime, etc.

Further, in attachment of the imaging unit 100A to various window glasses 20 having different refractive indices or window glasses 20 having various coatings or the like with different refractive indices applied on the surface, by using as the low refractive index layer 140, a variable refractive index layer having a variable refractive index such as an electronic ink, the refractive index of the low refractive index layer 140 can be adjusted in accordance with the refractive index of the window glass 20. Thus, it is not necessary to separately prepare the imaging unit 100A in accordance with the refractive index of the window glass 20, the coating, or the like, and an imaging device 100 which can correspond to various refractive indices of the window glass 20, the coating, or the like, and which can reduce the production cost, can be provided.

Further, when a high refractive index layer (partial reflective layer) is further provided, which partially reflects light entering from outside the window glass 20 toward the camera 120, on the inside surface 20B of the window glass 20, such an effect to increase the refractive index of the window glass 20 can be achieved, and a more hardly visible imaging device 100 can be provided.

Further, the high refractive index layer (partial reflective layer) is provided preferably on a region included in the field of view of the camera 120 on the window glass 20. In such a case, an imaging device 100 hardly visible from outside the window glass 20 can be realized in a constitution which will not impair the design property of the window glass 20 as far as possible.

In the above, a device having the camera 120 and the antenna 150 has been explained as the imaging unit 100A, and a device having the imaging unit 100A having the camera 120 and the antenna 150, and the processing unit 100B having the image processor 100B1 and the wireless communication device 100B2, has been explained as the imaging device 100. However, the imaging unit 100A may be considered as a camera-equipped antenna device (antenna unit). Further, the imaging device 100 may be considered as a camera-equipped wireless communication device. In a case where the wireless communication device 100B2 and the antenna 150 function as a wireless base station of 5G communication, as explained in the present embodiment, the imaging device 100 may be considered as a camera-equipped wireless base station.

First Modified Example

Figure 5:
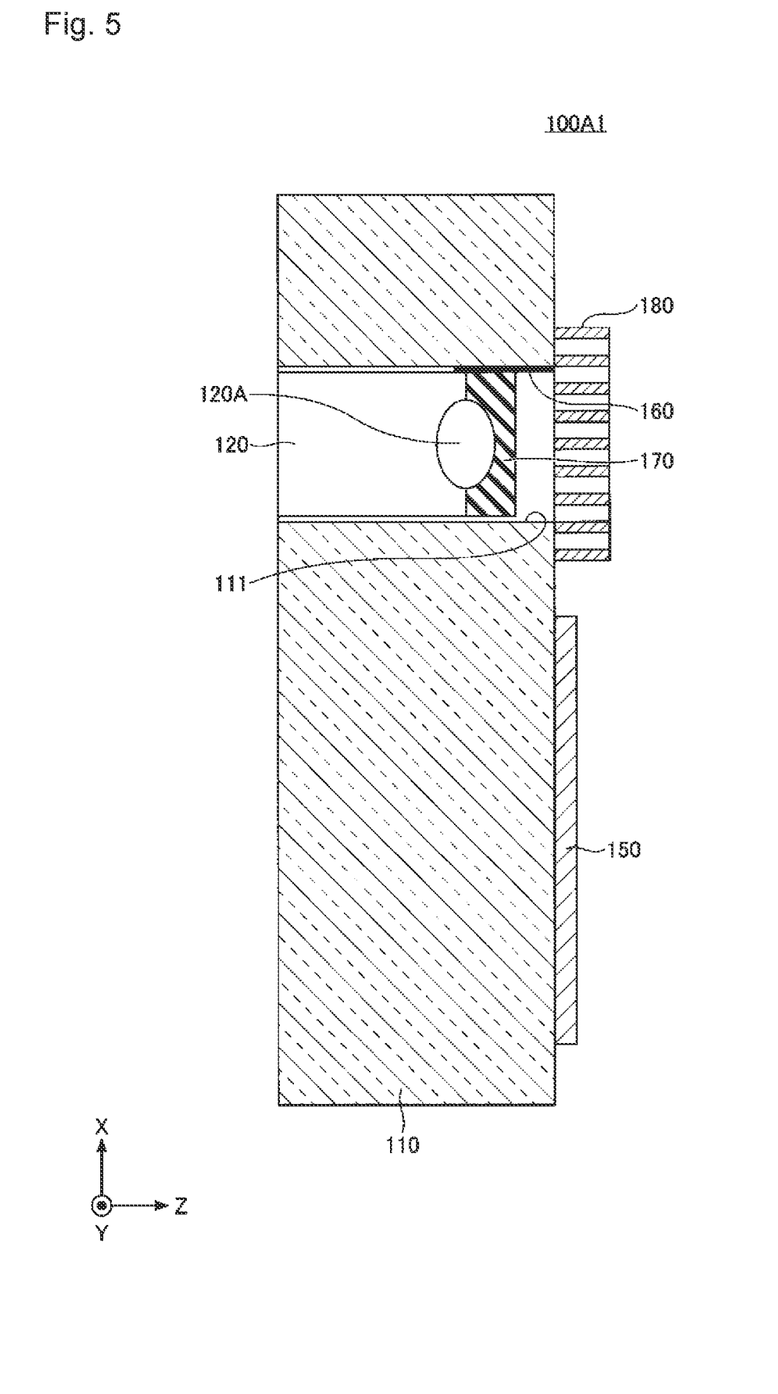
FIG. 5 is a view illustrating an imaging unit 100A1 according to a first modified example.

FIG. 5 is a view illustrating an imaging unit 100A1 according to a first modified example. In FIG. 5, the imaging unit 100A1 is illustrated by a cross section corresponding to FIG. 2D. The imaging unit 100A1 has, in addition to the imaging unit 100A shown in FIG. 2, eaves 160, a matching layer 170 and a mesh cover 180. The mesh cover 180 is an example of the mesh. The imaging unit 100A1 has no low refractive index layer 140 shown in FIGS. 3 and 4.

The eaves 160 are provided on a top surface in parallel with the YZ plane located on the +X direction side (upper side) in the inner wall surface of the through-hole 111. The eaves 160 are, as an example, a resin layer formed by coating the top surface of the through-hole 111 with a coating material having light shielding property. The resin layer as the eaves 160 should have light shielding property and is black as an example. Such eaves 160 are provided at a portion on the +Z direction side (outside as seen from the camera 120) than the center of the thickness in the Z direction (optical axis direction) of the lens 120A, on the top surface of the through-hole 111. That is, the eaves 160 extend toward the window glass 20 side than the lens 120A of the camera 120.

The eaves 160 are provided to block out light which enters the lens 120A from above when images are captured by the camera 120, thereby to acquire clear images of an object. By providing the eaves 160, shadows can be formed under the eaves 160. The eaves 160 are provided to prevent backlight e.g. by sunlight or streetlight thereby to prevent blocked up shadows and blown out highlights on the images. Further, by providing the eaves 160, the camera 120 can be hardly visible from the direction of the eaves 160 toward the camera 120. Further, by providing the eaves 160, sunlight and illumination light inside the building 10 are less likely to hit the camera 120, and the camera 120 can be hardly visible from outside the building 10.

Here, an embodiment in which the eaves 160 are provided on the top surface in the inner wall surface of the through-hole 111, is described, however, the position of the eaves 160 may be set to an appropriate position according to the environment of the position where the imaging unit 100A1 is installed. Further, in a case where the eaves 160 are provided on the top surface of the through-hole 111, they may be provided on the entire top surface.

The matching layer 170 is a transparent (colorless transparent) layer provided in the through-hole 111 so as to cover the lens 120A. The matching layer 170 is a refractive index matching layer to relax the refractive index difference between the lens 120A and the window glass 20. The refractive index of the matching layer 170 is a refractive index between the refractive index of the lens 120A and the refractive index of the window glass 20. As such a matching layer 170, for example, a sheet-shape member prepared by a resin which can realize an optical waveguide such as an optical fiber may be used. By providing the matching layer 170 between the lens 120A and the window glass 20, clearer images can be acquired by the camera 120.

Here, an embodiment in which the above described sheet-shape member is used as the matching layer 170 is described, however, instead of the matching layer 170, a sheet-shaped member constituted by a meta-material having a negative refractive index, or a sheet-shaped member constituted by a chiral medium having non-reciprocity in the refractive index may be used. The sheet-shaped member constituted by a meta-material is capable of controlling the refractive index. The sheet-shaped member constituted by a chiral medium is capable of a constitution having different polarization properties depending upon the incident direction, and is thereby capable of controlling the refractive index utilizing such differences in polarization properties.

The mesh cover 180 is provided on the surface on the window glass 20 side of the glass plate 110 to cover the lens 120A of the camera 120. The mesh cover 180 is provided to block out light which enters the lens 120A from above, like the eaves 160, when images are captured by the camera 120, thereby to acquire clear images of an object. The mesh cover 180 is a cover formed of a metal such as aluminum, silver, iron or stainless steel, or a resin such as polyester or vinyl chloride, having network through-holes formed. The mesh cover 180 may have adhesion by applying an adhesive on its surface, or the mesh cover 180 having adhesion may be bonded to a resin plate of e.g. polycarbonate or a glass plate having light transparency.

Such a mesh cover 180 has light transparency by the network through-holes. Further, by setting the direction of the through-holes of the mesh cover 180, the direction of light transparency of the mesh cover 180 can be adjusted. Thus, the mesh cover 180 can shield, like the eaves 160, the lens 120A from light entering from above when images are captured by the camera 120.

The mesh cover 180 may be made to have a reflectance on the surface on the lens 120A side lower than the reflectance on the surface on the window glass 20 side, by making the surface on the lens 120A side black or the like. By the reflectance on the surface on the lens 120A side lower than the reflectance on the surface on the window glass 20 side, the direction of light transparency of the mesh cover 180 can be adjusted, and the lens 120A can be shielded from incident light when images are captured by the camera 120. The reflectance of the mesh cover 180 may be measured, for example, in accordance with JIS R 3106:1998.

The line width of the mesh is preferably from 100 µm to 3 mm, more preferably from 300 µm to 1 mm. The line distance of the mesh is preferably from 0.5 mm to 50 mm, more preferably from 0.7 mm to 5 mm, further preferably from 0.8 mm to 2 mm. The open area ratio of the mesh is preferably from 30 to 80%, more preferably from 40 to 60%. The shape of the opening of the through-holes of the mesh may be rectangular or rhomboidal. The mesh cover 180 has a visible light transmittance of from 20% to 90% based on standard illuminant A as specified by JIS R 3106:1998.

The imaging unit 100A1 according to the first modified example is hardly visible from outside the building 10, in the same manner as the imaging unit 100A. Accordingly, a hardly visible imaging device which can capture clearer images, can be provided.

In the above, an embodiment in which the imaging unit 100A has the eaves 160 and the mesh cover 180 so as to shield the lens 120A from light entering from above, has been described, however, the imaging unit 100A1 may have either one of the eaves 160 and the mesh cover 180. The imaging unit 100A1 should have at least one of the eaves 160 and the mesh cover 180, depending upon the situation of incidence of light at the position where the imaging unit 100A1 is installed.

Second Modified Example

Figure 6:
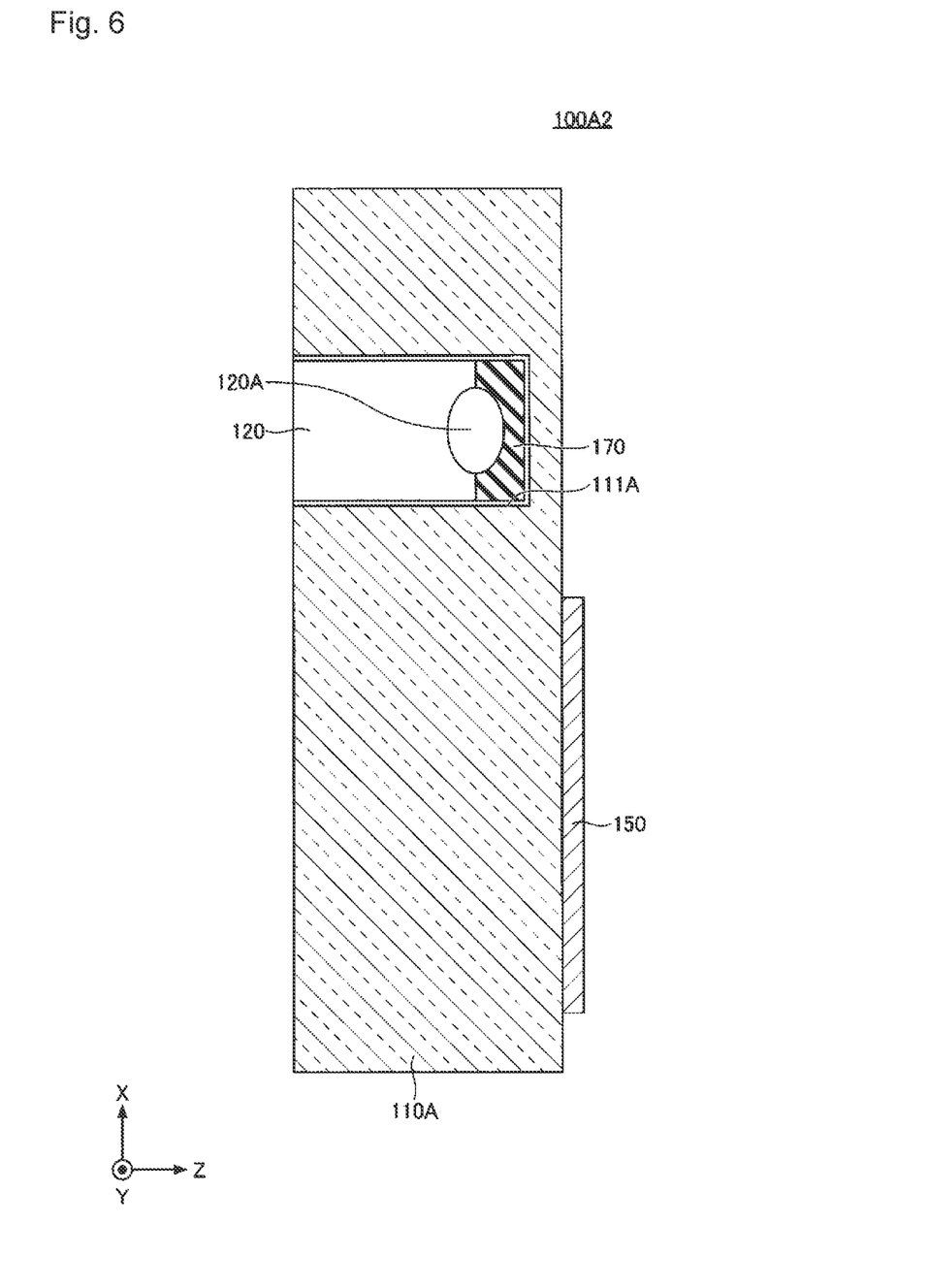
FIG. 6 is a view illustrating an imaging unit 100A2 according to a second modified example.

FIG. 6 is a view illustrating an imaging unit 100A2 according to a second modified example. In FIG. 6, the imaging unit 100A2 is illustrated by a cross section corresponding to FIG. 2D. The imaging unit 100A2 has a constitution having the glass plate 110 of the imaging unit 100A shown in FIG. 2 replaced with a glass plate 110A and further having a matching layer 170.

The glass plate 110A has a constitution having the through-hole 111 (see FIG. 2) of the glass plate 110 replaced with a hole 111A. The hole 111A is as an example a dent recessing from the surface on the −Z direction side to the thickness direction (Z direction) of the glass plate 110A. The hole 111A has such a structure that the +Z direction side of the through-hole 111 of the glass plate 110 is blocked. The shape of the opening of the hole 111A on the surface on the −Z direction side of the glass plate 110A is in conformity with the outer shape of a camera 120 to be held in the hole 111A and is rectangular as an example.

The hole 111A has the camera 120 and the matching layer 170 provided therein. A wiring (wiring corresponding to the wiring 121 in FIG. 2A) to be connected to the camera 120 held in the hole 111A of the glass plate 110A should be provided on the surface on the −Z direction side of the glass plate 110A. Here, an embodiment in which the hole 111A holds the entire camera 120 is explained as an example, however, the hole 111A should hold at least a part of the camera 120. That is, a part of the camera 120 may protrude from the hole 111A toward the −Z direction.

The matching layer 170 is provided on the deeper side of the lens 120A inside the hole 111A. The matching layer 170 is the same as the matching layer 170 of the imaging unit 100A1 in the first modified example and its description is omitted here.

Such an imaging unit 100A2 having the camera 120 provided inside the hole 111A can capture images of an object outside the window glass 20 by the camera 120, in the same manner as the imaging unit 100A. Accordingly, a hardly visible imaging device can be provided. Further, since the glass plate 110A has the hole 111A which holds at least a part of the camera 120, the camera 120 can be attached stably to the glass plate 110A by a simple constitution.

The hole 111A may be a hole recessing from the surface on the +Z direction side to the thickness direction (Z direction) of the glass plate 110A. In such a case, there is no glass plate 110A present in front of the lens 120A of the camera 120.

Further, in a case where the glass plate 110A may have dew condensation, an antifogging film may be provided at least on portion located in front of the lens 120A of the glass plate 110A (a portion located on the +Z direction side of the hole 111A). The antifogging film may be attached to the glass plate 110A via a film having an adhesive layer. By providing the antifogging film on the glass plate 110A, dew condensation can be suppressed, and clear images can be acquired by the camera 120.

Third Modified Example

Figure 7:
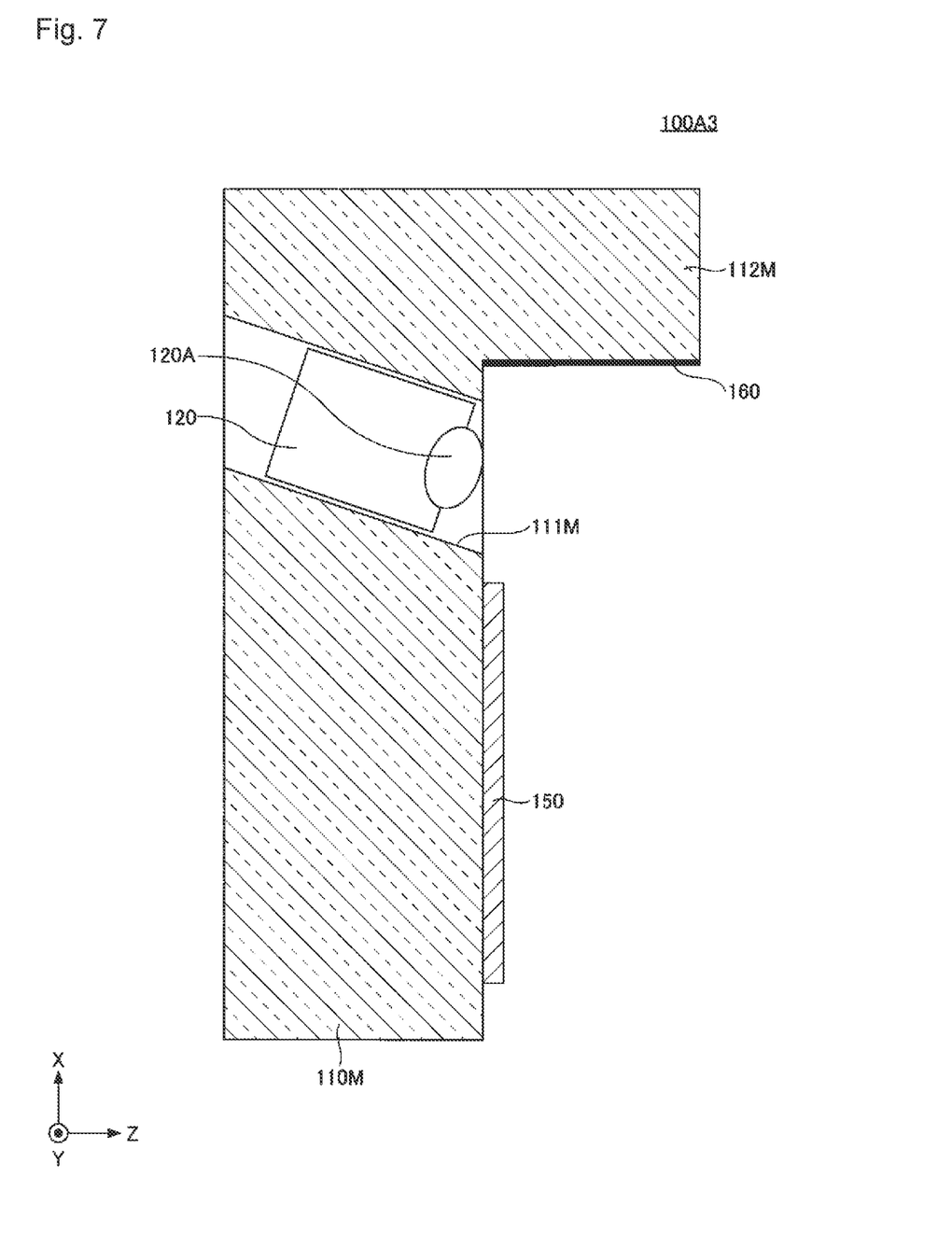
FIG. 7 is a view illustrating an imaging unit 100A3 according to a third modified example.

FIG. 7 is a view illustrating an imaging unit 100A3 according to a third modified example. In FIG. 7, the imaging unit 100A3 is illustrated by a cross section corresponding to FIG. 2D. The imaging unit 100A3 has a constitution having the glass plate 110 of the imaging unit 100A shown in FIG. 2D replaced with a glass plate 110M and further having eaves 160.

The glass plate 110M has a through-hole 111M formed with an inclination so that the +Z direction side is located below the −Z direction side, and a protrusion 112M which protrudes toward the +Z direction side above the portion where the through-hole 111M is provided on the glass plate 110M. The through-hole 111M is formed with an inclination to the surface of the glass plate 110M.

When the camera 120 is held in such a through-hole 111M as shown in FIG. 7, the lens 120A faces downward. Thus, images of a person outside the window glass 20 are likely to be captured from above. Further, for example, by attaching the imaging unit 100A3 inside the window glass 20 in a high floor, that is e.g. a second or higher floor in the building 10, images of a wider range can be captured.

The protrusion 112M protrudes toward the +Z direction side of the glass plate 110M from a portion where the through-hole 111M is provided, and has eaves 160 provided on the bottom surface. The protrusion 112M is a part of the glass plate 110M and is transparent (colorless transparent).

Thus, by the eaves 160, the lens 120A can be shielded from light entering from above when images are captured by the camera 120, and clear images of an object can be acquired.

Accordingly, a hardly visible imaging device which can capture clearer images in a wider range, can be provided.

The through-hole 111M may be formed with an inclination so that the +Z direction side is located above the −Z direction side. In such a case, the lens 120A faces upward. The lens 120A may be set to face upward, in such a manner, for example when images of an object present above the position where the camera 120 is installed, are to be captured.

Fourth Modified Example

Figure 8:
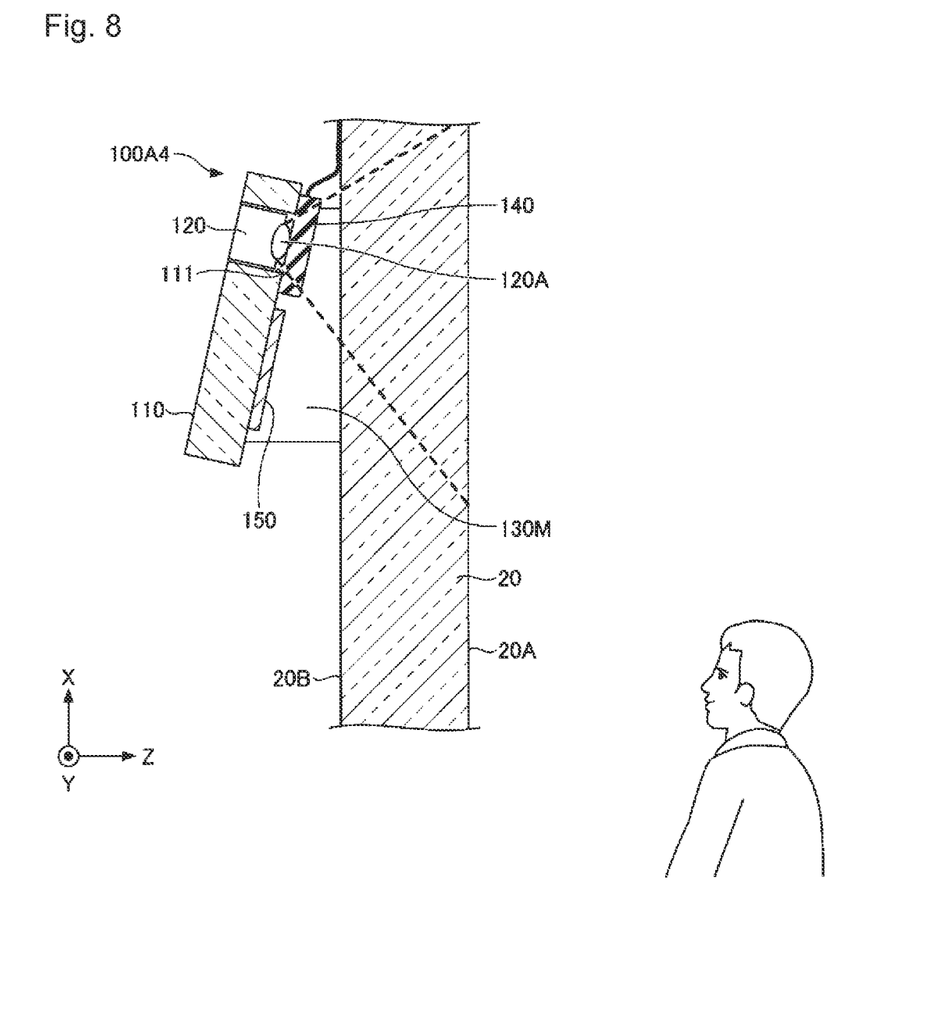
FIG. 8 is a view illustrating an imaging unit 100A4 according to a fourth modified example.

FIG. 8 is a view illustrating an imaging unit 100A4 according to a fourth modified example. The imaging unit 100A4 has a constitution having the attaching part 130 of the imaging unit 100A' shown in FIG. 4 replaced with an attaching part 130M. The attaching part 130M has a trapezoidal shape with the lower base longer than the upper base when the imaging unit 100A4 is viewed in the XZ plane. The upper base is the upper-side base of the trapezoidal attaching part 130M, and the lower base is the lower-side base of the trapezoidal attaching part 130M. Further, viewing the imaging unit 100A4 in the XZ plane means viewing the imaging unit 100A4 from its side.

When the glass plate 110 is attached to the inside surface 20B of the window glass 20 via such an attaching part 130M, the glass plate 110 is inclined so that the surface on the window glass 20 side faces downward, and thus the lens 120A of the camera 120 faces downward. Thus, images of a person present outside the window glass 20 are likely to be captured from above. Further, for example, by attaching the imaging unit 100A4 inside the window glass 20 in a high floor, that is e.g. a second or higher floor in the building 10, images of a wider range can be captured.

Accordingly, an imaging device which can capture clearer images in a wider range, can be provided. Further, since the glass plate 110 is attached with an inclination, the camera 120 can be made to face downward without attaching the camera 120 with an inclination to the glass plate 110.

Such an attaching part 130M is an attaching part which attaches the glass plate 110 with an inclination to the inside surface 20B of the window glass 20 so that the distance between the lower edge of the glass plate 110 and the inside surface 20B of the window glass 20 is wider than the distance between the upper edge of the glass plate 110 and the inside surface 20B of the window glass 20.

The shape of the attaching part 130M as viewed from its side is not limited to trapezoidal, and may be any shape so long as the distance between the lower edge of the glass plate 110 and the inside surface 20B of the window glass 20 is wider than the distance between the upper edge of the glass plate 110 and the inside surface 20B of the window glass 20. For example, the shape of the attaching part 130M as viewed from its side may be triangle. Further, for example, the attaching part 130M may have such a shape that it has protrusions protruding toward the inside surface 20B of the window glass 20 and fixed to the surface 20B, on the upper and lower edges, the protrusion on the upper edge being shorter than the protrusion on the lower edge.

Further, the trapezoidal shape of the attaching part 130M may be a trapezoidal shape such that the lower base is shorter than the upper base when the imaging unit 100A4 is viewed from its side. In such a case, the lens 120A faces upward. The lens 120A is made to face upward by using a trapezoidal attaching part 130M with the lower base shorter than the upper base, for example when images of an object present above the position where the camera 120 is installed are to be captured. By attaching the glass plate 110 with an inclination, the camera 120 can be made to face upward, without attaching the camera 120 with an inclination to the glass plate 110.

In such a case, the attaching part 130M is an attaching part to attach the glass plate 110 with an inclination to the inside surface 20B of the window glass 20 so that the distance between the lower edge of the glass plate 110 and the inside surface 20B of the window glass 20 is narrower than the distance between the upper edge of the glass plate 110 and the inside surface 20B of the window glass 20.

The shape of the attaching part 130M as viewed from its side is not limited to trapezoidal, and may be any shape so long as the distance between the lower edge of the glass plate 110 and the inside surface 20B of the window glass 20 is narrower than the distance between the upper edge of the glass plate 110 and the inside surface 20B of the window glass 20. For example, the shape of the attaching part 130M as viewed from its side may be triangle. Further, for example, the attaching part 130M may have such a shape that it has protrusions protruding toward the inside surface 20B of the window glass 20 and fixed to the surface 20B, on the upper and lower edges, the protrusion on the upper edge being longer than the protrusion on the lower edge.

Further, the attaching part 130M may have a variable angle mechanism capable of changing the angle of installation of the glass plate 110 to the inside surface 20B of the window glass 20. In such a case, the angle of the glass plate 110 can be changed depending upon e.g. the time or the season, and the range in which images can be captured by the camera 120 can be changed. Further, by the variable angle mechanism of the attaching part 130M, the angle of the glass plate 110 may be made changeable to either upward or downward.

The imaging device according to embodiments of the present invention have been described above in detail, however, it should be understood that the present invention is not limited to specific embodiments, and various changes and modifications are possible without departing from the intention and the scope of the present invention.

This application is a continuation of PCT Application No. PCT/JP2022/003044, filed on Jan. 27, 2022, which is based upon and claims the benefit of priority from Japanese Patent Application No. 2021-013719 filed on Jan. 29, 2021. The contents of those applications are incorporated herein by reference in their entireties.

REFERENCE SYMBOLS

10: building (an example of building structure)
20: window glass
100: imaging device
100A, 100A1, 100A2, 100A3, 100A4: imaging unit
100B: processing unit
100B1: image processor
100B2: wireless communication device
110, 110A, 110M: glass plate (an example of transparent plate and fixing part)
111, 111M: though hole (an example of holding part)
111A: hole (an example of holding part)
120: camera (an example of imaging unit)
130, 130M: attaching part (an example of fixing part)

140: low refractive index layer (an example of low refractive index layer and variable refractive index layer)
150: antenna
160: eaves
170: matching layer
180: mesh cover (an example of mesh)

What is claimed is:

1. An imaging device, comprising: an imaging unit installed inside a window glass of a building, to capture images of outside of the window glass through the window glass; and
a fixing part to fix the imaging unit toward the window glass, wherein the fixing part has a transparent plate to which the imaging unit is attached, and a transparent attaching part to attach the transparent plate to an inside surface of the window glass.

2. The imaging device according to claim 1, wherein the attaching part is an attaching part which attaches the transparent plate with an inclination to the inside surface of the window glass, so that the distance between the lower edge of the transparent plate and the inside surface of the window glass is wider than the distance between the upper edge of the transparent plate and the inside surface of the window glass, or the distance between the lower edge of the transparent plate and the inside surface of the window glass is narrower than the distance between the upper edge of the transparent plate and the inside surface of the window glass.

3. The imaging device according to claim 1, which further has a wiring connected to the imaging unit, formed on the transparent plate, and
wherein the wiring has light transparency.

4. The imaging device according to claim 3, wherein the wiring is constituted by a metal mesh.

5. The imaging device according to claim 1, wherein the transparent plate has a holding part which holds at least a part of the imaging unit, and the holding part is a through-hole that pierces the transparent plate in the thickness direction, or a hole that recesses from the surface of the transparent plate to the thickness direction.

6. The imaging device according to claim 5, wherein the through-hole or hole as the holding part is formed with an inclination to the surface of the transparent plate.

7. The imaging device according to claim 1, wherein the transparent plate has eaves extending toward the window glass side than a lens of the imaging unit.

8. The imaging device according to claim 1, which further has a mesh to cover a lens of the imaging unit, provided on the window glass side surface of the transparent plate.

9. The imaging device according to claim 8, wherein the reflectance of the mesh, on the lens side surface, is lower than the reflectance on the window glass side surface.

10. The imaging device according to claim 1, which further has a low refractive index layer having a refractive index lower than the refractive index of the window glass, provided between the transparent plate and the window glass.

11. The imaging device according to claim 10, wherein the low refractive index layer is a variable refractive index layer having a variable refractive index.

12. An imaging device, comprising:
an imaging unit installed inside a window glass of a building, to capture images of outside of the window glass through the window glass;
a fixing part to fix the imaging unit toward the window glass, wherein the fixing part has a transparent plate to which the imaging unit is attached, and an attaching part to attach the transparent plate to an inside surface of the window glass; and an antenna having light transparency, formed on the transparent plate.

13. The imaging device according to claim 12, wherein the antenna is constituted by a metal mesh.

14. An imaging device, comprising:

an imaging unit installed inside a window glass of a building, to capture images of outside of the window glass through the window glass;

a fixing part to fix the imaging unit toward the window glass; and a partial reflective layer which partially reflects light entering from outside the window glass toward the imaging unit, provide on the inside surface of the window glass.

15. The imaging device according to claim 14, wherein the partial reflective layer is provided in a portion included in the field of view of the imaging unit, on the window glass.

\* \* \* \* \*